(12) United States Patent
Schoonover et al.

(10) Patent No.: US 7,438,173 B1
(45) Date of Patent: Oct. 21, 2008

(54) CONVEYOR LIFTING SYSTEM

(76) Inventors: Albert G. Schoonover, 1023 W. Avenue B, Bismarck, ND (US) 58501-2407; Gordon L. Schoonover, 721 79th Ave. NE., Bismarck, ND (US) 58503

(*) Notice: Subject to any disclaimer, the term of this patent is extended or adjusted under 35 U.S.C. 154(b) by 0 days.

(21) Appl. No.: 11/780,960

(22) Filed: Jul. 20, 2007

(51) Int. Cl.
  *B65G 21/10* (2006.01)
(52) U.S. Cl. .................................. 198/312; 198/316.1
(58) Field of Classification Search ............... 198/312, 198/315, 316.1, 861.3, 861.5
  See application file for complete search history.

(56) References Cited

U.S. PATENT DOCUMENTS

| | | | | |
|---|---|---|---|---|
| 2,631,715 A | * | 3/1953 | Vickers | 198/312 |
| 2,759,591 A | * | 8/1956 | Erickson | 198/316.1 |
| 2,967,602 A | * | 1/1961 | Mosier | 198/316.1 |
| 4,977,999 A | * | 12/1990 | Smock | 198/861.5 |
| 6,244,418 B1 | * | 6/2001 | Desrochers | 198/316.1 |
| 6,808,057 B1 | * | 10/2004 | Nirmal et al. | 198/312 |

OTHER PUBLICATIONS

Access, EarthWorks Machinery Company, magazine ad, Aug. 2005, p. 13.
Access, Sulley & Son's Enterprises, magazine ad, Aug. 2005, p. 14.
Access, Rock Systems, Inc., magazine ad, p. 95.
Access, Inter-Mountain Construction, magazine ad, p. 96.
Contractors Hot Line, Aztec Companies, magazine ad, Jan. 2007, p. 13.

* cited by examiner

*Primary Examiner*—James R Bidwell

(57) ABSTRACT

A conveyor lifting system for efficiently pivoting and stabilizing a conveyor unit. The conveyor lifting system generally includes a conveyor unit including a first end and a second end, a support structure positioned beneath a substantial portion of the conveyor unit, wherein the support structure is positioned adjacent the second end and a plurality of hydraulic cylinders attached between the conveyor unit and the support structure. The first end is opposite the second end upon the conveyor unit, wherein the conveyor unit pivots about a pivot axis adjacent the second end and wherein the plurality of hydraulic cylinders selectively pivot the conveyor unit about the pivot axis. The support structure may also include a plurality of rollers to engage the conveyor unit and allow the support structure to freely adjust between the first end and the second end.

20 Claims, 6 Drawing Sheets

CONVEYOR LIFTING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to aggregate conveyors and more specifically it relates to a conveyor lifting system for efficiently pivoting and stabilizing a conveyor unit.

2. Description of the Related Art

Any discussion of the prior art throughout the specification should in no way be considered as an admission that such prior art is widely known or forms part of common general knowledge in the field.

Aggregate conveyors have been in use for years. Typically, aggregate conveyors or apron feeders are utilized in transporting aggregate material (i.e. sand, gravel, etc.) from a stationary pile to a vehicle, wherein the vehicle transports the aggregate material away for use. Because of the large amounts of aggregate material generally needed to be conveyed at one time, the conveyors are generally very large in size.

When utilizing the conveyor unit, the conveyor unit must generally be pivoted to transport the material from the stationary pile to the vehicle. For this purpose, the present invention is generally directed towards a new and improved conveyor lifting system for efficiently pivoting and stabilizing a conveyor unit.

BRIEF SUMMARY OF THE INVENTION

The general purpose of the present invention is to provide a conveyor lifting system that has many of the advantages of the aggregate conveyors mentioned heretofore. The invention generally relates to an aggregate conveyor which includes a conveyor unit including a first end and a second end, a support structure positioned beneath a substantial portion of the conveyor unit, wherein the support structure is positioned adjacent the second end and a plurality of hydraulic cylinders attached between the conveyor unit and the support structure. The first end is opposite the second end upon the conveyor unit, wherein the conveyor unit pivots about a pivot axis adjacent the second end and wherein the plurality of hydraulic cylinders selectively pivot the conveyor unit about the pivot axis.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a conveyor lifting system for efficiently pivoting and stabilizing a conveyor unit.

Another object is to provide a conveyor lifting system that allows for the wheel structure of the conveyor unit to move from a transporting position to an in-use position.

An additional object is to provide a conveyor lifting system that efficiently pivots a conveyor unit.

A further object is to provide a conveyor lifting system that is easily utilized.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
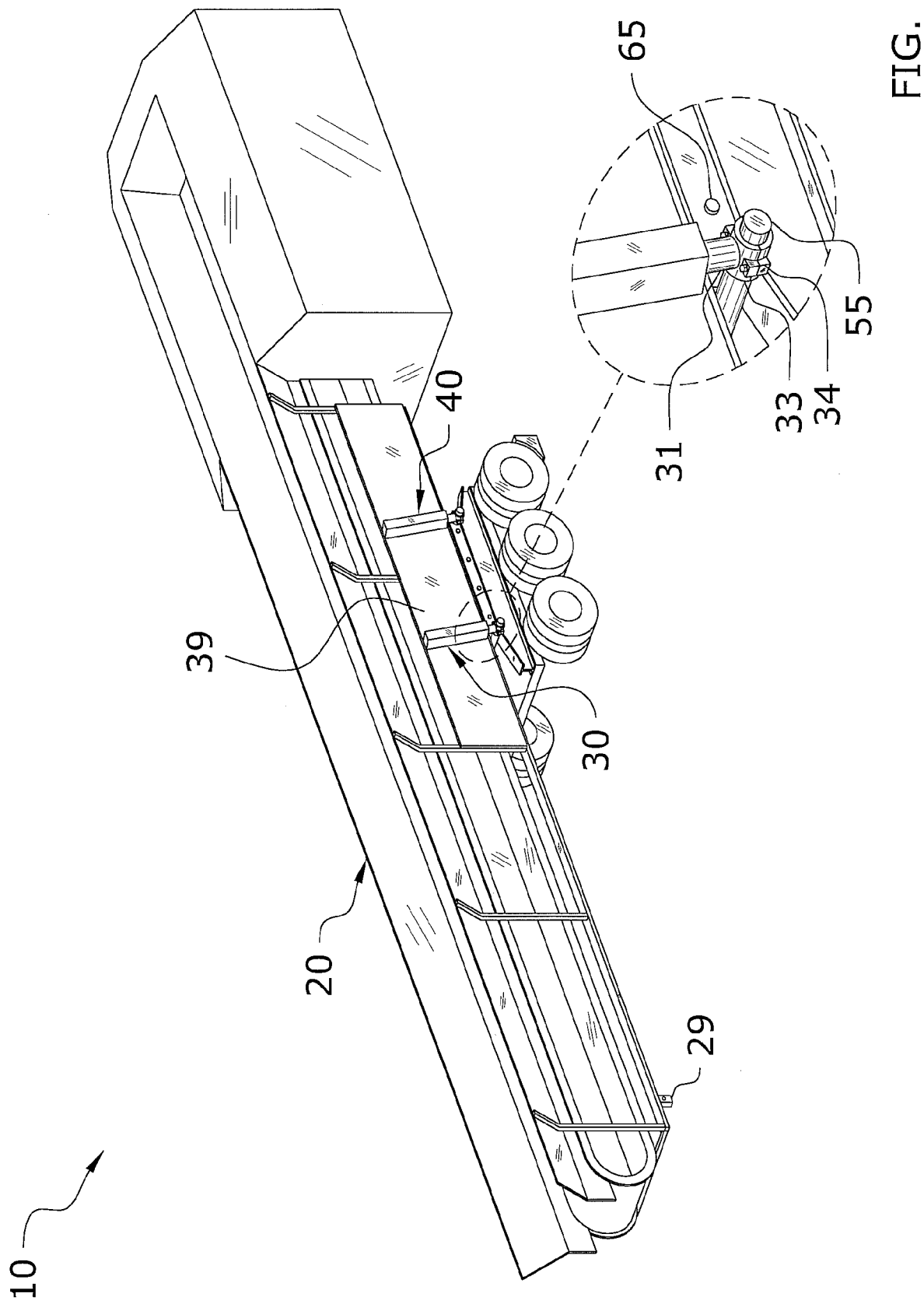
FIG. 1 is an upper perspective view of the present invention with a magnified portion of the attachment between the actuator and the support structure.

Turning now descriptively to the drawings, in which similar reference characters denote similar elements throughout the several views, FIGS. 1 through 6 illustrate a conveyor lifting system 10, which comprises a conveyor unit 20 including a first end 26 and a second end 27, a support structure 50 positioned beneath a substantial portion of the conveyor unit 20, wherein the support structure 50 is positioned adjacent the second end 27 and a plurality of actuators 30, 40 attached between the conveyor unit 20 and the support structure 50.

The first end 26 is opposite the second end 27 upon the conveyor unit 20, wherein the conveyor unit 20 pivots about a pivot axis adjacent the second end 27 and wherein the plurality of actuators 30, 40 selectively pivot the conveyor unit 20 about the pivot axis. The support structure 50 may also include a plurality of rollers 60 to engage the conveyor unit 20 and allow the support structure 50 to freely adjust between the first end 26 and the second end 27.

B. Conveyor Unit

The conveyor unit 20 utilized with the present invention is preferably comprised of a standard aggregate material 12 conveyor unit 20 commonly utilized in conveying aggregate material 12 (i.e. gravel, sand, rocks, etc.) from a stationary pile or point to a vehicle, wherein the vehicle generally transports the aggregate material 12 to a place of use. The conveyor unit 20 may be comprised of a configuration that is drivable or the conveyor unit 20 may be comprised of a configuration to be pulled or pushed by a separate vehicle.

Figure 5:
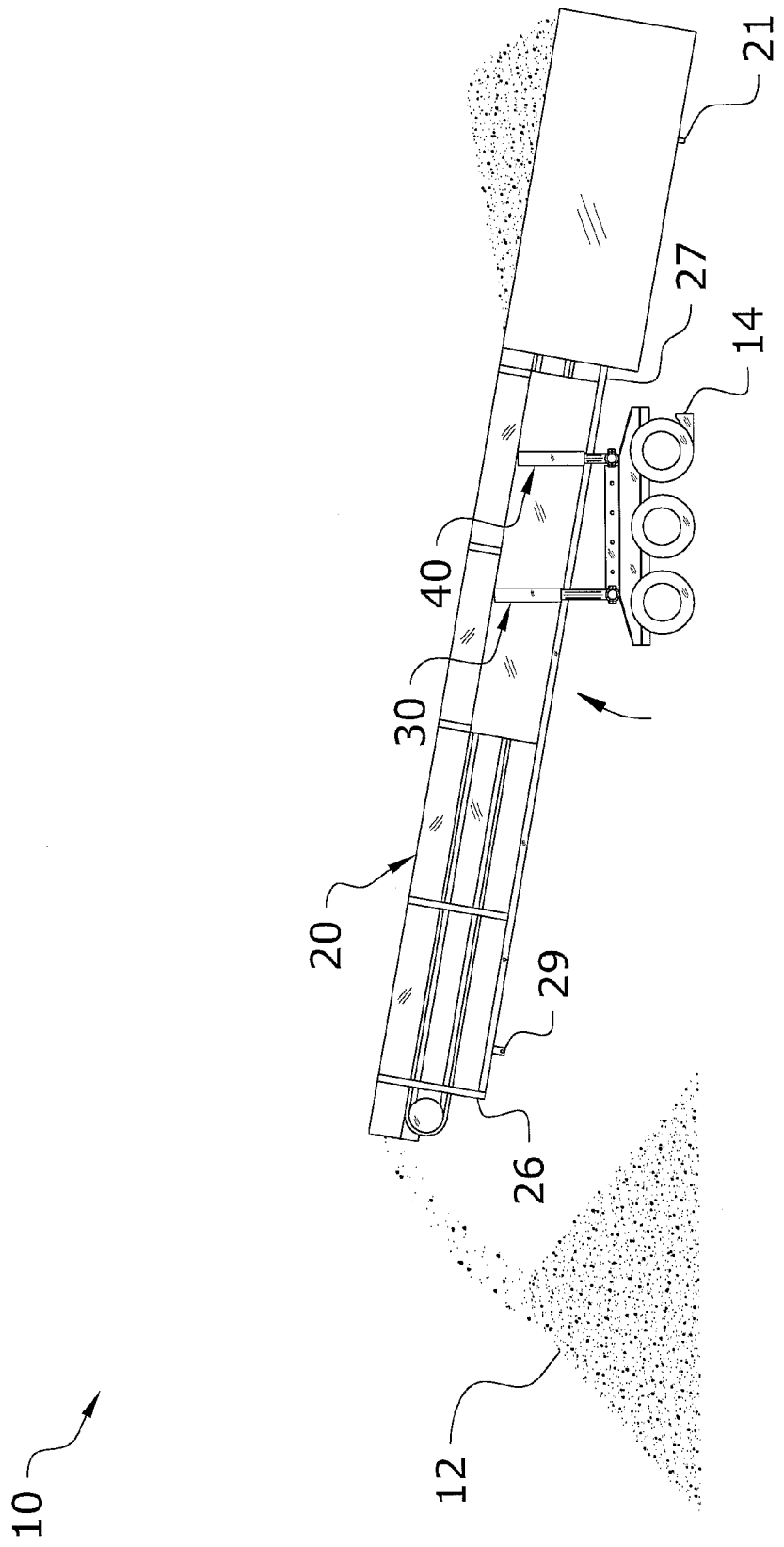
FIG. 5 is a side view of the present invention attached to a conveyor unit, wherein the conveyor unit is pivoted towards an in use position.

The conveyor unit 20 preferably includes a hitch 21 to removably attach to the vehicle utilized to transport the conveyor unit 20. The conveyor unit 20 is also preferably comprised of a large and heavy duty conveyor unit 20 to handle large amounts of aggregate material 12 as shown in FIG. 5. It is appreciated that the conveyor unit 20 utilized with the present invention may transport various materials, rather than aggregate materials 12.

Figure 4:
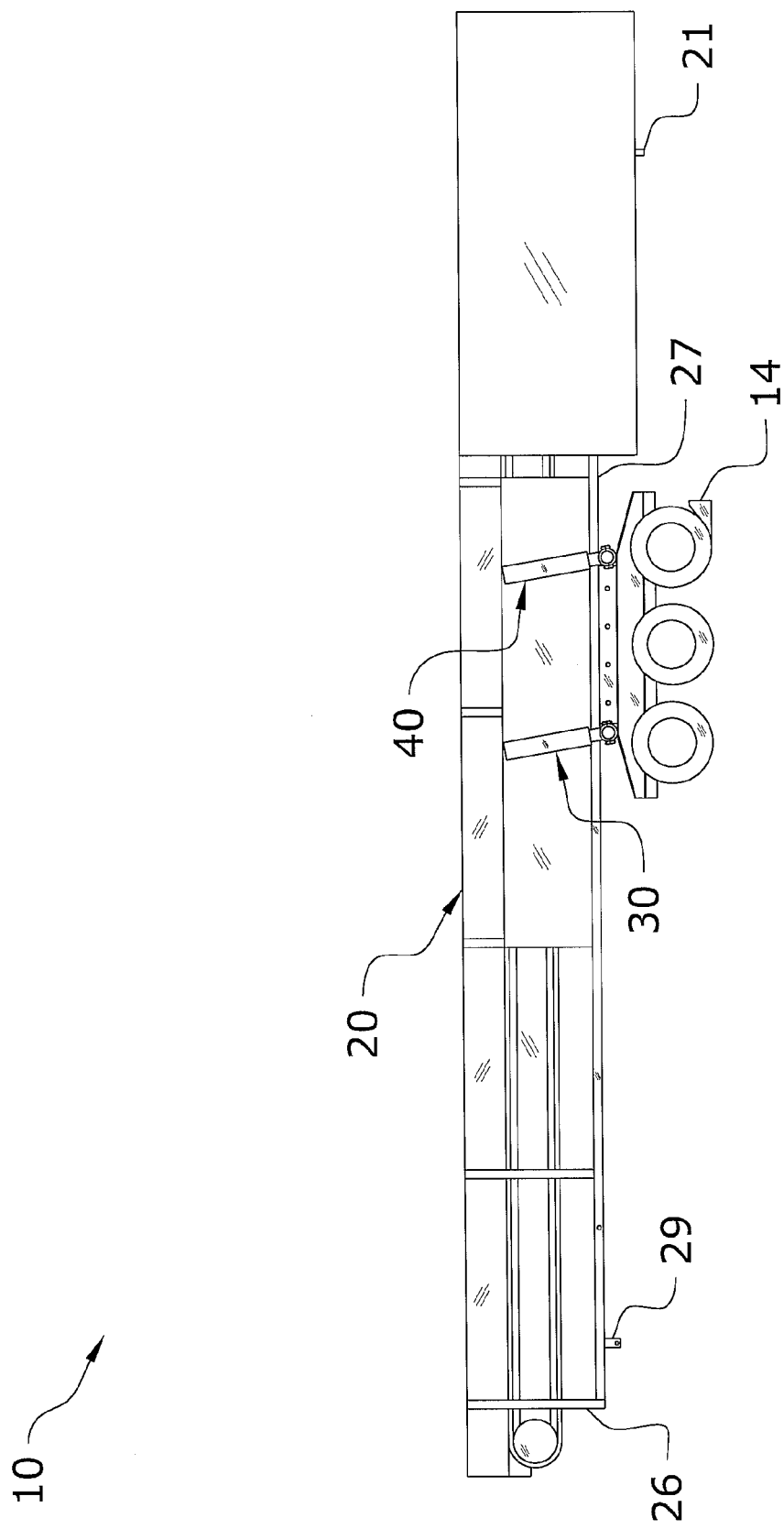
FIG. 4 is a side view of the present invention attached to a conveyor unit.

The conveyor unit 20 includes a conveying portion 22, wherein the conveying portion 22 circulates about the conveyor unit 20 and transports the aggregate material 12 from one point to another as illustrated in FIG. 5. The conveying portion 22 may be comprised of various materials, such as but not limited to metal, plastic or rubber. The conveying portion 22 is also preferably substantially surrounded by and supported by a frame 23. The frame 23 preferably extends along a longitudinal axis of the conveyor unit 20 as illustrated in FIGS. 1, 4 and 5.

Figure 2:
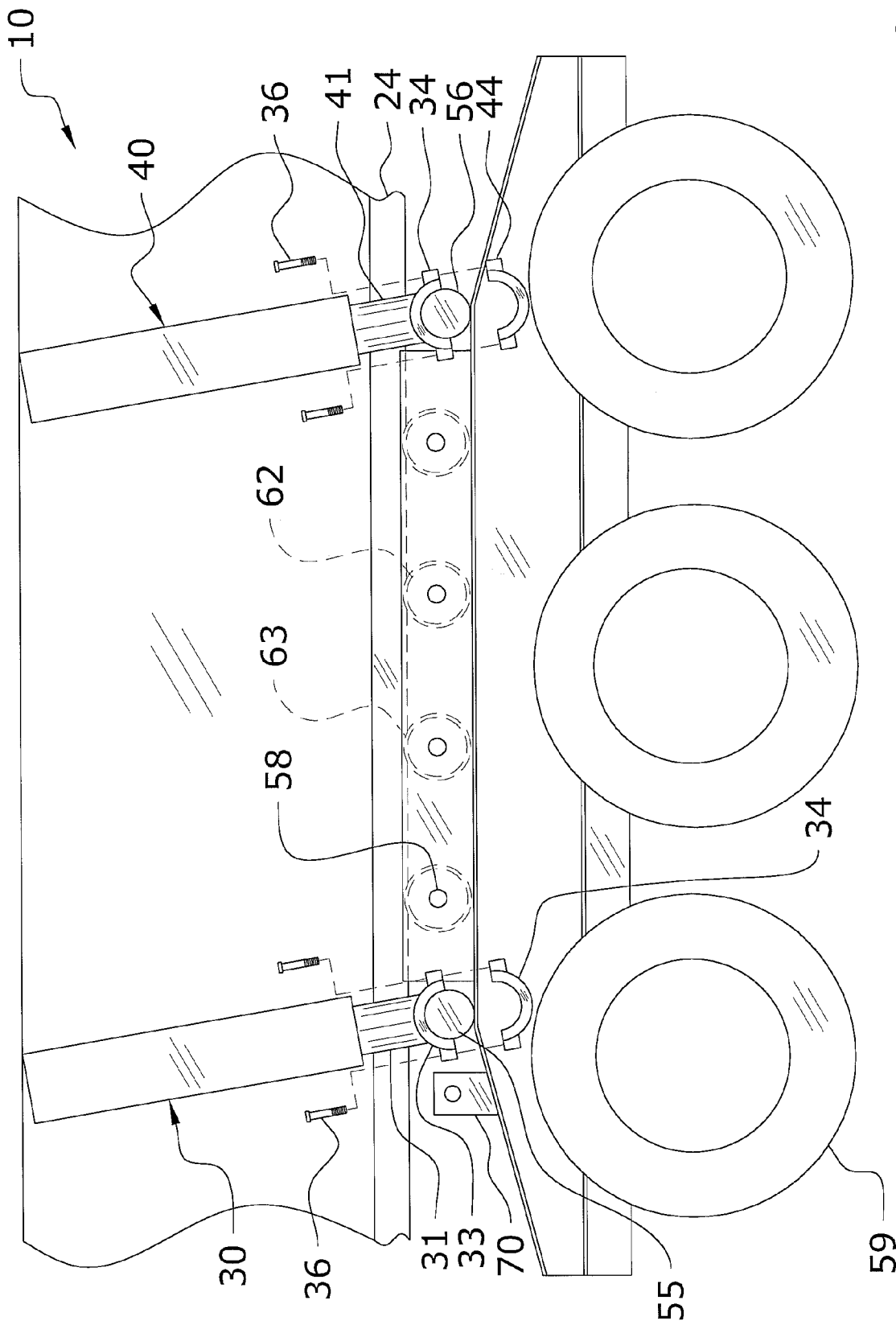
FIG. 2 is a magnified view of the actuator and the support structure, wherein the clamps are exploded from the coupler.
Figure 3:
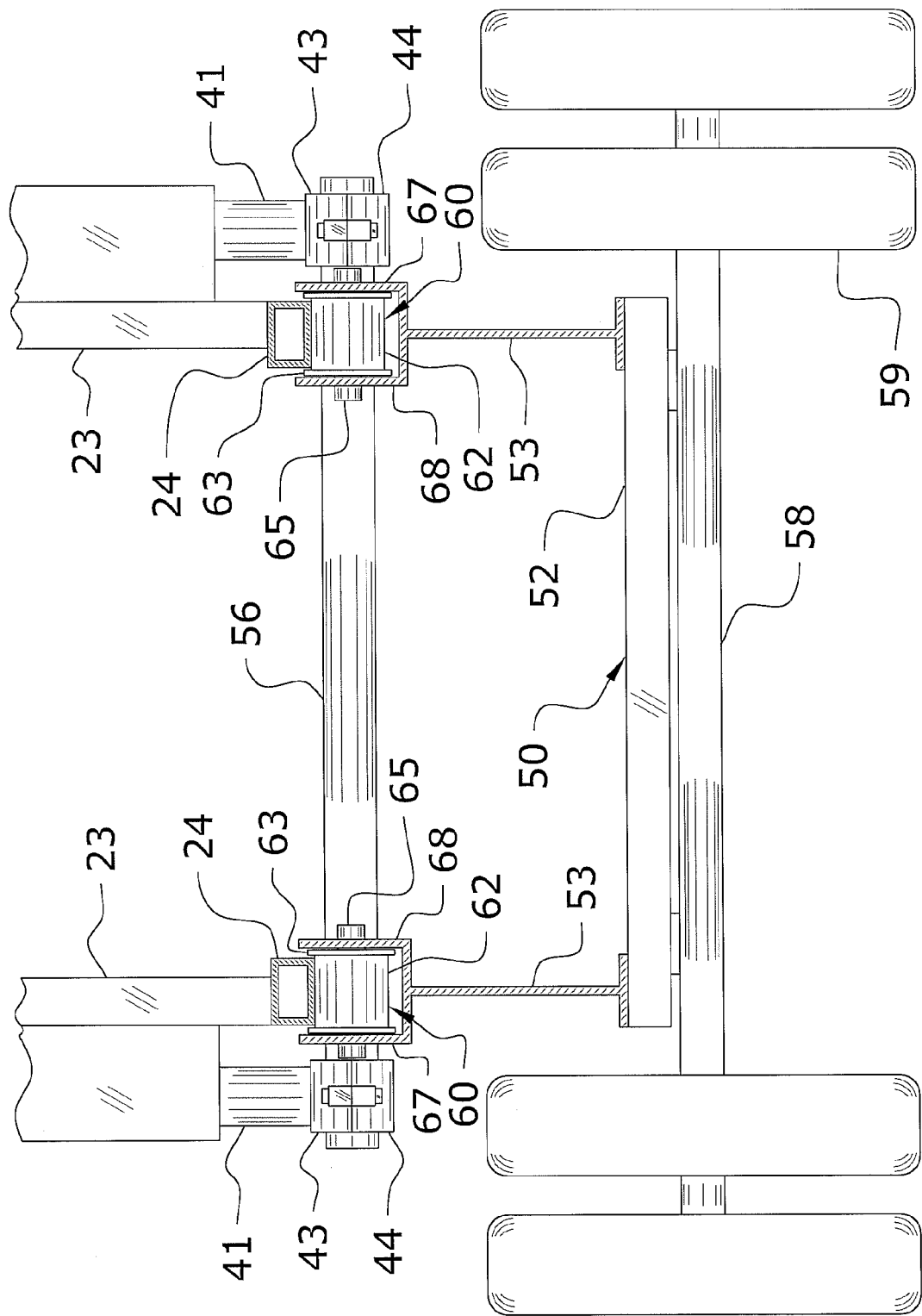
FIG. 3 is a rear sectional view of the present invention illustrating the engagement of the elongated members and the rollers.

The frame 23 also preferably includes a pair of elongated members 24 extending lengthwise along the frame 23. The elongated members 24 preferably extend along a lower side of the frame 23 and selectively engage the support structure 50 as illustrated in FIG. 3. The support structure 50 preferably engages the elongated members 24 when the support structure 50 is being adjusted between the first end 26 and the second end 27 of the conveyor unit 20. The elongated members 24 also engage the support structure 50 when the conveyor unit 20 is in a non-pivoted position as illustrated in FIGS. 1 through 4.

Figure 6:
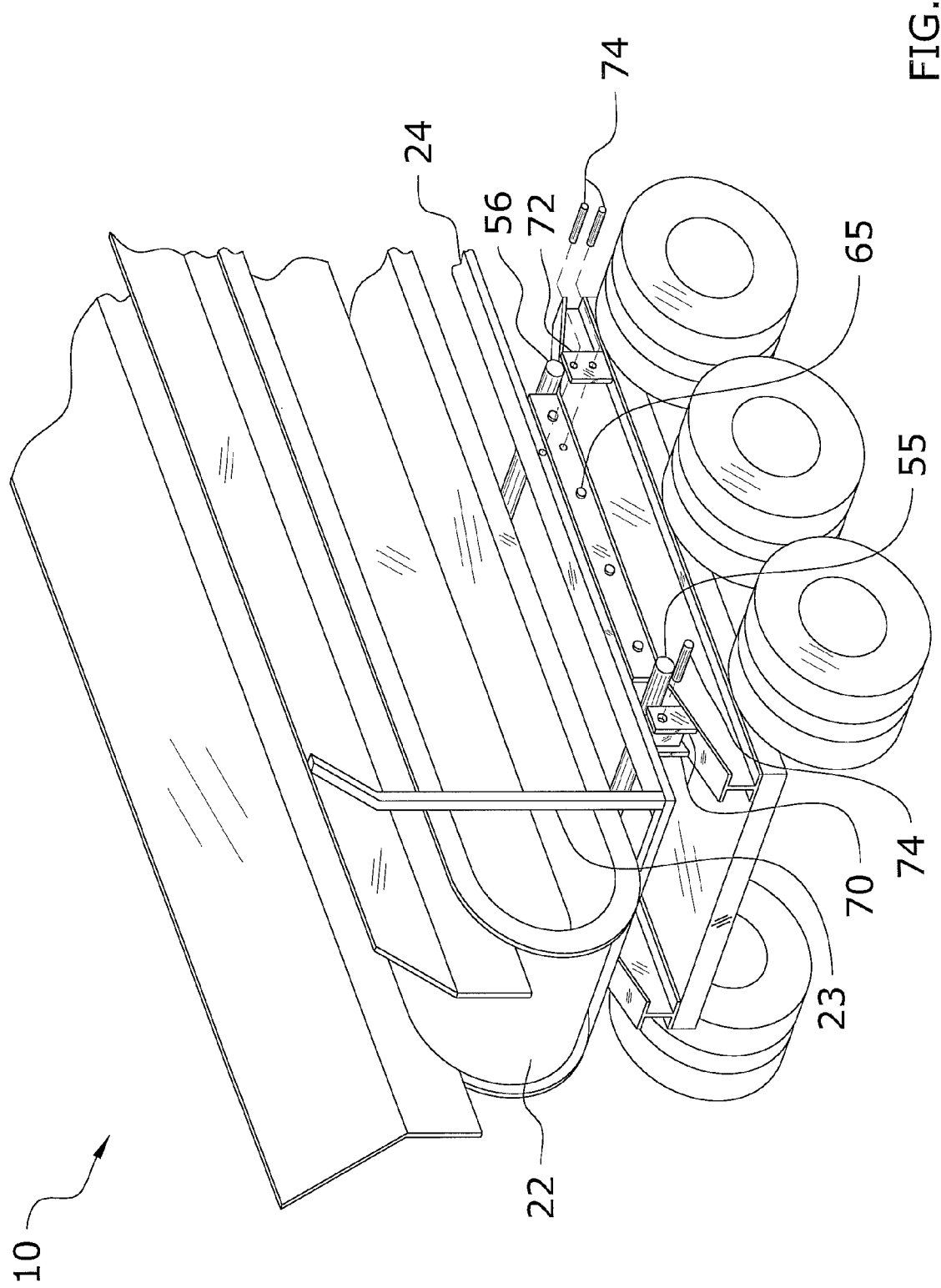
FIG. 6 is an upper perspective view of the support structure of the present invention positioned adjacent a rear end of the conveyor unit.

The first end 26 and the second end 27 are positioned upon opposing ends of the conveyor unit 20, wherein the first end 26 of the conveyor unit 20 preferably dispenses the aggregate material 12 and the second end 27 of the conveyor unit 20 receives the aggregate material 12. The conveyor unit 20 further pivots about a pivot axis adjacent the second end 27 of the conveyor unit 20 as illustrated in FIGS. 4 and 5. A connecting member 29 also preferably extends downwardly from each of the elongated members 24 adjacent the first end 26 of the conveyor unit 20 to removably attach and secure the support structure 50 as illustrated in FIGS. 1 and 6.

C. Actuators

The present invention includes a plurality of actuators 30, 40 to selectively pivot the conveyor unit 20 about the support structure 50 and the pivot axis as illustrated in FIGS. 4 and 5. The actuators 30, 40 may be comprised of various configurations all which are able to support and pivot the conveyor unit 20. The actuators 30, 40 are also preferably comprised of a hydraulic cylinder configuration; however it is appreciated the actuators 30, 40 may be comprised of various configurations rather than the preferred embodiment such as but not limited to gas cylinders or pneumatic cylinders.

The present invention further preferably includes 4 actuators 30, 40, wherein a pair of first actuators 30 and a pair of second actuators 40 are each positioned upon opposing sides of the conveyor unit 20 and attach upon and adjacent each of the 4 outer corners of the support structure 50. It is appreciated however that more or less actuators 30, 40 may be utilized with the present invention than the preferred embodiment, wherein the number of actuators 30, 40 utilized may depend on various factors, such as but not limited to the length of the conveyor unit 20.

The actuators 30, 40 are attached adjacent the second end 27 of the conveyor unit 20 as illustrated in FIGS. 1 through 5. Each of the pairs of actuators 30, 40 is further preferably attached to a support plate 39, wherein the support plate 39 is attached to the conveyor unit 20. It is appreciated however that the actuators 30, 40 may be attached to the conveyor unit 20 in various manners, such as but not limited to directly attach to the conveyor unit 20.

The actuators 30, 40 also preferably extend downwardly from the conveyor unit 20 and at a rearward angle in relation to the direction of travel of the conveying portion 22 and aggregate material 12 as illustrated in FIGS. 1, 2, 4 and 5. Each of the actuators 30, 40 further defines an acute angle with the longitudinal axis of the conveyor unit 20 and the second end 27 of the conveyor unit 20. In the preferred embodiment of the present invention, the angle that the actuators 30, 40 extend is further preferably 10 degrees offset from a right angle with respect to the longitudinal axis of the conveyor unit 20.

The offset angle with the longitudinal axis of the conveyor unit 20 forms a right angle with the ground surface when the conveyor unit 20 is in the pivoted position as illustrated in FIG. 6. It is further preferred that the actuators 30, 40 provide the greatest amount of support for the conveyor unit 20 when the conveyor unit 20 is in the pivoted position, thus the reason for the initial offset angle with respect to the longitudinal axis of the conveyor unit 20 and subsequently the right angle formed between the actuators 30, 40 and the ground plane.

The actuators 30, 40 include an extension portion 31, 41 that removably attaches to the support structure 50 via a clamp. The extension portion 31, 41 extends from the actuator 30, 40 when the conveyor unit 20 is being pivoted. It is appreciated that the first extension portion 31 associated with the first actuators 30 positioned nearest the first end 26 may be of a greater length than the second extension portion 41 associated with the second actuator 40 positioned nearer the second end 27. The first extension portion 31 positioned nearer the first end 26 subsequently has to extend a greater distance than the second extension portion 41 positioned nearest the second end 27 as illustrated in FIG. 6.

Each extension member preferably includes a clamp positioned opposite the conveyor unit 20 and adjacent the support structure 50. Each clamp preferably removably attaches upon a coupler member 55, 56 of the support structure 50 as illustrated in FIGS. 1 through 3. Each clamp also preferably includes an upper clamp portion 33, 43 and a lower clamp portion 34, 44, wherein the lower clamp portion 34, 44 removably attaches upon the upper clamp portion 33, 43 and over the coupler member 55, 56. The upper clamp portion 33, 43 and the lower clamp portion 34, 44 are further preferably secured together via a plurality of fasteners 36 as illustrated in FIGS. 1 through 3. It is appreciated that the clamps 33, 34, 55 and 56 and/or the fasteners 36 may be comprised of a plurality of configurations rather than the preferred embodiment.

D. Support Structure

The support structure 50 attaches to the actuators 30, 40 when pivoting the conveyor unit 20 and to the conveyor unit 20 when transporting or during non-use of the conveyor unit 20 as illustrated in FIGS. 1 through 6. The support structure 50 is preferably comprised of a strong and durable material such as steel, wherein the support structure 50 is able to support excessive amounts of weight and extended use. The support structure 50 is also able to slidably adjust about the frame 23 and conveyor unit 20 depending on whether the conveyor unit 20 is being transported or if the conveyor unit 20 is in use. It is appreciated that the support structure 50 may extend from various places of the frame 23; however it is preferred that a substantial portion of the support structure 50 is positioned below the conveyor unit 20 and the frame 23.

During transport of the conveyor unit 20 the support structure 50 is preferably slidably adjusted towards a rear of the conveyor unit 20 opposite the vehicle so as to provide support for the first end 26 of the conveyor unit 20 as illustrated in FIG. 6. During use of the conveyor unit 20 the support structure 50 is preferably slidably adjusted towards the second end 27 of the conveyor unit 20 adjacent the vehicle to allow the conveying portion 22 and conveyor unit 20 to pivot and operate in a normal manner as illustrated in FIGS. 4 and 5.

The support structure 50 includes a lower support 52 and a pair of support members 53 as illustrated in FIG. 3. The support structure 50 also preferably includes a plurality of wheels 59 positioned opposite the conveyor unit 20, wherein the wheels 59 allow the conveyor unit 20 and the support structure 50 to be a mobile structure, wherein the wheels 59 are rotatably attached to an axle 58 and the axle 58 is rotatably attached to the support structure 50. It is appreciated however that the support structure 50 and the conveyor unit 20 may be comprised of a stationary structure.

A coupler member 55, 56 is also preferably positioned about front and rear ends of the support structure 50. The coupler members 55, 56 are preferably comprised of an elongated shaft configuration, wherein the coupler members 55, 56 each extend across opposing ends of the support structure 50 to removably attach to opposing actuators 30, 40 as illustrated in FIGS. 1 through 6. The present invention preferably includes a first coupler member 55 to attach to the first actuators 30 and a second coupler member 56 to attach to the second actuators 40 as shown in FIGS. 1 and 2.

It is appreciated that the coupler members 55, 56 may be integrally formed with the support structure 50 or comprised of separate structures. It is also appreciated that the coupler members 55, 56 may be comprised of various configurations rather than the preferred embodiment. The clamps 33, 34, 55 and 56 of the actuators 30, 40 are preferably snugly attached upon the coupler members 55, 56, wherein the clamps 33, 34, 55 and 56 are able to rotate about the coupler members 55, 56 when the conveyor unit 20 is being pivoted.

The support structure 50 also preferably includes an outer support 67 and an inner support 68 longitudinally positioned upon each of the support members 53. Each of the outer supports 67 and the inner supports 68 are also preferably positioned substantially between the coupler members 55, 56 as illustrated in FIG. 2. A plurality of rollers 60 are further positioned between each of the outer supports 67 and inner supports 68 as illustrated in FIGS. 2 and 3.

The rollers 60 are able to freely spin 74 within the outer support 67 and the inner support 68 via a spindle member 65. The rollers 60 each preferably include an inner portion 62 and a pair of outer portions 63 positioned upon opposing sides of the inner portion 62. The inner portion 62 engages the elongated member 24 of the frame 23 of the conveyor unit 20 and the outer portions 63 extend over the outer sides of the elongated members 24 to secure the rollers 60 from moving from side to side. When the conveyor unit 20 is in the non-pivoted position and the actuators 30, 40 are detached from the coupler members 55, 56 the position of the support structure 50 in relation to the conveyor unit 20 may be adjusted via the rollers 60 rolling upon the elongated member 24 of the frame 23.

The support structure 50 may also include a pair of first connecting plates 70 between the second coupler member 56 and the rear end of the support structure 50 as illustrated in FIG. 6. The first connecting plates 70 preferably extend upon opposing sides of the connecting member 29 of the conveyor unit 20 when the support structure 50 is positioned near the first end 26 of the conveyor unit 20. A pin 74 may subsequently be utilized to attach the first connecting plates 70 to the connecting member 29 and thus support structure 50 to the conveyor unit 20 by extending the pin 74 through the first connecting plates 70 and the connecting member 29.

It is appreciated that a second connecting plate 72 may also be utilized when the support structure 50 is being attached near the first end 26 of the conveyor unit 20 as illustrated in FIG. 6. The second connecting plate 72 is positioned over the outer plate and the elongated member 24, wherein a pair of pins 74 may be subsequently extended through openings in the second connecting plate 72, outer plate and the elongated member 24 as illustrated in FIG. 6. The second connecting plate 72 simply serves provide a more secure connecting between the support structure 50 and the conveyor unit 20. It is appreciated that the second connecting plate 72 may be integrally formed with the support structure 50 or conveyor unit 20 or the second connecting plate 72 may be comprised of a separate structure.

E. IN Use

In use, the conveyor unit 20 is first positioned in an area where the user desires to transport aggregate material 12. The pins 74 may now be removed from the first connecting plates 70 and the second connecting plate 72. A wheel block 14 that is suitable for preventing the wheels 59 from rotating is positioned behind a respective wheel 59. The conveyor unit 20 is now moved rearward by backing up the vehicle and attached conveyor unit 20 until the actuators 30, 40 substantially align with the coupler members 55, 56. The actuators 30, 40 are also ensured to be of a great enough height so as to not engage the coupler members 55, 56 when the support structure 50 is being adjusted.

The lower clamp portion 34, 44 is now removed from the upper clamp portion 33, 43 of the each actuators 30, 40 and the extension member of each of the actuators 30, 40 is extended from the actuator 30, 40 unit the upper clamp portion 33, 43 engages the coupler members 55, 56. The lower clamp portion 34, 44 may now be positioned upon an opposing side of the coupler members 55, 56 and fastened via the fasteners 36 to the upper clamp portion 33, 43 as illustrated in FIG. 2.

The attachment structure is now secured to the conveyor unit 20 via the actuators 30, 40. The actuators 30, 40 may now be extended and the conveyor unit 20 pivoted, wherein the first actuator 30 nearest the first end 26 of the conveyor unit 20 is preferably extended a greater distance than the second actuators 40 nearest the second end 27. The conveyor unit 20 may now be utilized in a normal manner. When the user is finished utilizing the conveyor unit 20 and the conveyor unit 20 is desired to be transported the above process may simply be reversed thus reattaching the support structure 50 adjacent the first end 26 of the conveyor unit 20.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A conveyor lifting system, comprising:
    a conveyor unit including a first end and a second end, wherein said first end is opposite said second end and wherein said conveyor unit pivots about a pivot axis adjacent said second end;
    a support structure positioned beneath a substantial portion of said conveyor unit, wherein said support structure adjusts between said first end and said second end; and
    a plurality of actuators to attach between said conveyor unit and said support structure, wherein said plurality of actuators selectively pivot said conveyor unit about said pivot axis when said support structure is adjacent said second end of said conveyor unit;
    wherein said conveyor unit is in a non-pivotal position with respect to said support structure when said support structure is adjacent said first end of said conveyor unit.

2. The conveyor lifting system of claim 1, wherein said support structure includes at least one coupler, wherein said plurality of actuators selectively attach to said at least one coupler.

3. The conveyor lifting system of claim 2, wherein said at least one coupler is comprised of an elongated shaft configuration.

4. The conveyor lifting system of claim 2, wherein said plurality of actuators are rotatably attached to said at least one coupler.

5. The conveyor lifting system of claim 1, wherein said plurality of actuators extend away from said first end and towards said second end.

6. The conveyor lifting system of claim 1, wherein said plurality of actuators and a longitudinal axis of said conveyor unit define an acute angle.

7. The conveyor lifting system of claim 1, wherein said plurality of actuators, a longitudinal axis of said conveyor unit and said second end of said conveyor unit define an acute angle.

8. The conveyor lifting system of claim 1, wherein said plurality of actuators each include a clamp to removably attach to said support structure.

9. The conveyor lifting system of claim 1, wherein said plurality of actuators define a rearward angle with a ground plane when said conveyor unit is in said non-pivotal position.

10. The conveyor lifting system of claim 9, wherein said plurality of actuators define a right angle with said ground plane when said conveyor unit is in a pivoted position.

11. The conveyor lifting system of claim 1, wherein said plurality of actuators include a first pair of actuators and a second pair of actuators.

12. The conveyor lifting system of claim 11, wherein said pair of first actuators extend a greater length than said pair of second actuators.

13. The conveyor lifting system of claim 1, wherein said support structure includes a plurality of rollers to engage said conveyor unit.

14. The conveyor lifting system of claim 13, wherein said plurality of rollers engage a lower side of said conveyor unit.

15. The conveyor lifting system of claim 13, wherein said support structure adjusts between said first end and said second end via said plurality of rollers.

16. The conveyor lifting system of claim 15, wherein said support structure freely adjusts between said first end and said second end via said plurality of rollers.

17. The conveyor lifting system of claim 1, wherein said support structure includes a plurality of wheels to engage a ground surface.

18. The conveyor lifting system of claim 1, wherein said plurality of actuators are comprised of a hydraulic cylinder configuration.

19. A conveyor lifting system, comprising:
    a conveyor unit including a first end and a second end, wherein said first end is opposite said second end and wherein said conveyor unit pivots about a pivot axis adjacent said second end;
    a support structure positioned beneath a substantial portion of said conveyor unit, wherein said support structure is positioned adjacent said second end;
    a plurality of hydraulic cylinders attached between said conveyor unit and said support structure, wherein said plurality of hydraulic cylinders selectively pivot said conveyor unit about said pivot axis;
    wherein said support structure includes at least one coupler, wherein said plurality of hydraulic cylinders selectively attach to said at least one coupler and wherein said at least one coupler is comprised of an elongated shaft configuration;
    wherein said plurality of hydraulic cylinders are rotatably attached to said at least one coupler;
    wherein said plurality of hydraulic cylinders extend away from said first end and towards said second end;
    wherein said plurality of hydraulic cylinders, said longitudinal axis of said conveyor unit and said second end of said conveyor unit define an acute angle;
    wherein said plurality of hydraulic cylinders each include a clamp to removably attach to said support structure;
    wherein said plurality of hydraulic cylinders define a rearward angle with a ground plane when said conveyor unit is in a non-pivoted position;
    wherein said plurality of hydraulic cylinders define a right angle with said ground plane when said conveyor unit is in a pivoted position;
    wherein said plurality of hydraulic cylinders include a first pair of hydraulic cylinders and a second pair of hydraulic cylinders and wherein said pair of first hydraulic cylinders extend a greater length than said pair of second hydraulic cylinders;
    wherein said support structure includes a plurality of rollers to engage said conveyor unit and wherein said plurality of rollers engage a lower side of said conveyor unit;
    wherein said support structure selectively adjusts between said first end and said second end via said plurality of rollers and wherein said support structure freely adjusts between said first end and said second end via said plurality of rollers; and
    a plurality of wheels rotatably attached to said support structure, wherein said plurality of wheels engage a ground surface.

20. A conveyor lifting system, comprising:
    a conveyor unit including a transporting position and an in-use position;
    a support structure to stabilize said conveyor unit in said transporting position and in said in-use position;
    wherein said support structure is positioned beneath said conveyor unit and adjusts from a first end of said conveyor unit to a second end of said conveyor unit depending on either said transporting position or said in-use position of said conveyor unit; and
    a plurality of actuators attached between said conveyor unit and said support structure to pivot said conveyor unit when in said in-use position.

* * * * *